United States Patent [19]

Ivers et al.

[11] 4,180,253
[45] Dec. 25, 1979

[54] SUPPORT FOR A MOTORCYCLE

[76] Inventors: Michael S. Ivers; Rory B. Ivers, both of 911 Los Molinos Way, Sacramento, Calif. 95825

[21] Appl. No.: 902,926

[22] Filed: May 5, 1978

[51] Int. Cl.² .............................................. B66F 3/00
[52] U.S. Cl. ...................................... 269/296; 211/22; 254/131
[58] Field of Search ............................ 254/1, 94, 131; 269/296; 211/22

[56] References Cited

U.S. PATENT DOCUMENTS 3,667,728  6/1972  Garelick ............................... 254/131
3,761,058  9/1973  Stone et al. ............................ 254/94

FOREIGN PATENT DOCUMENTS 691763  6/1940  Fed. Rep. of Germany ............. 211/22

Primary Examiner—Robert C. Watson
Attorney, Agent, or Firm—Mark C. Jacobs

[57] ABSTRACT

A support for supporting the front and rear wheels of a motorcycle in a raised position with respect to a supporting surface. The support includes a rigid framework structure having a rearwardly extending elongated rod to optionally receive the rear wheel thereon and upwardly extending brackets for engaging the framework of the motorcycle.

18 Claims, 9 Drawing Figures

U.S. Patent Dec. 25, 1979 Sheet 1 of 3 4,180,253
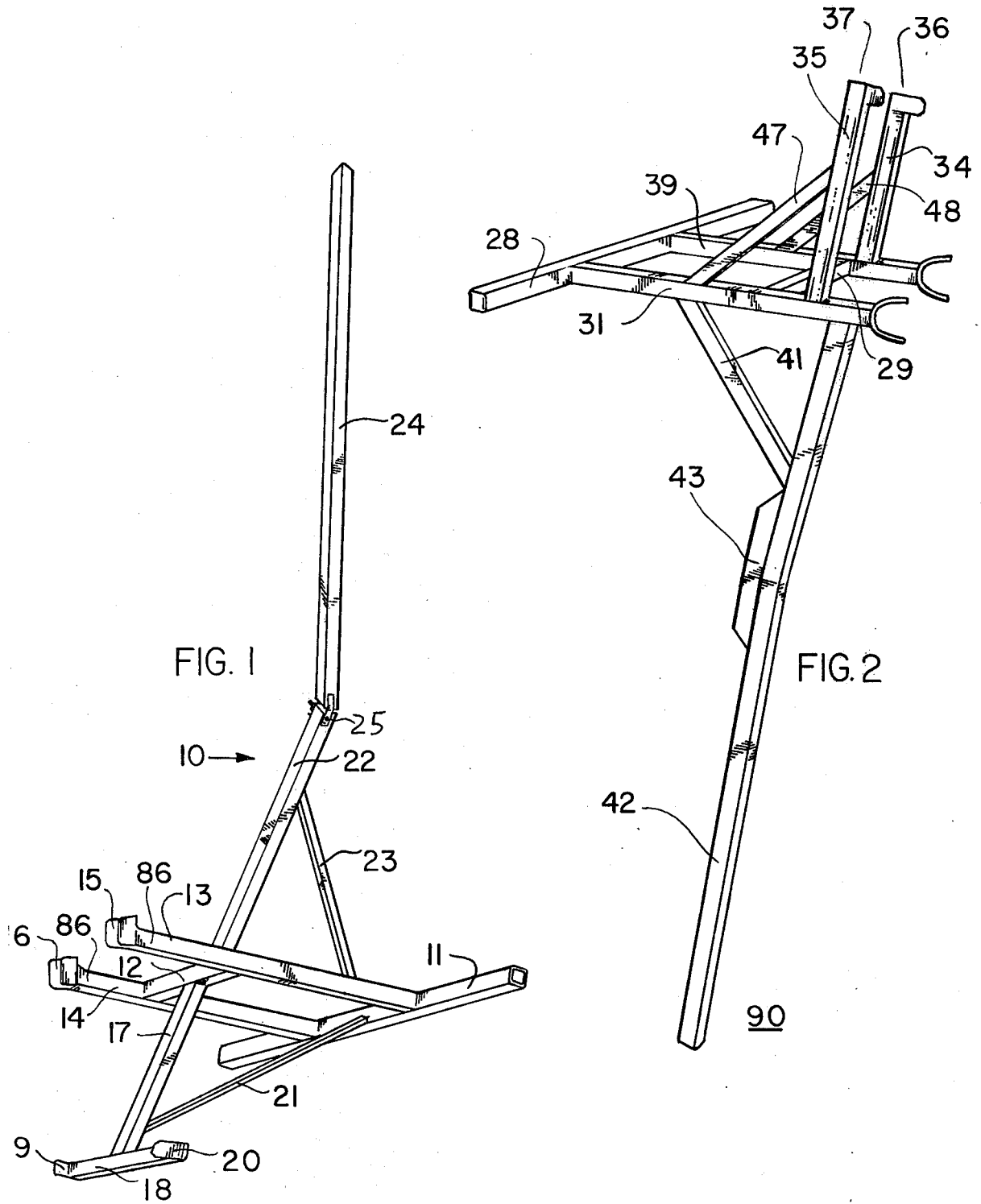

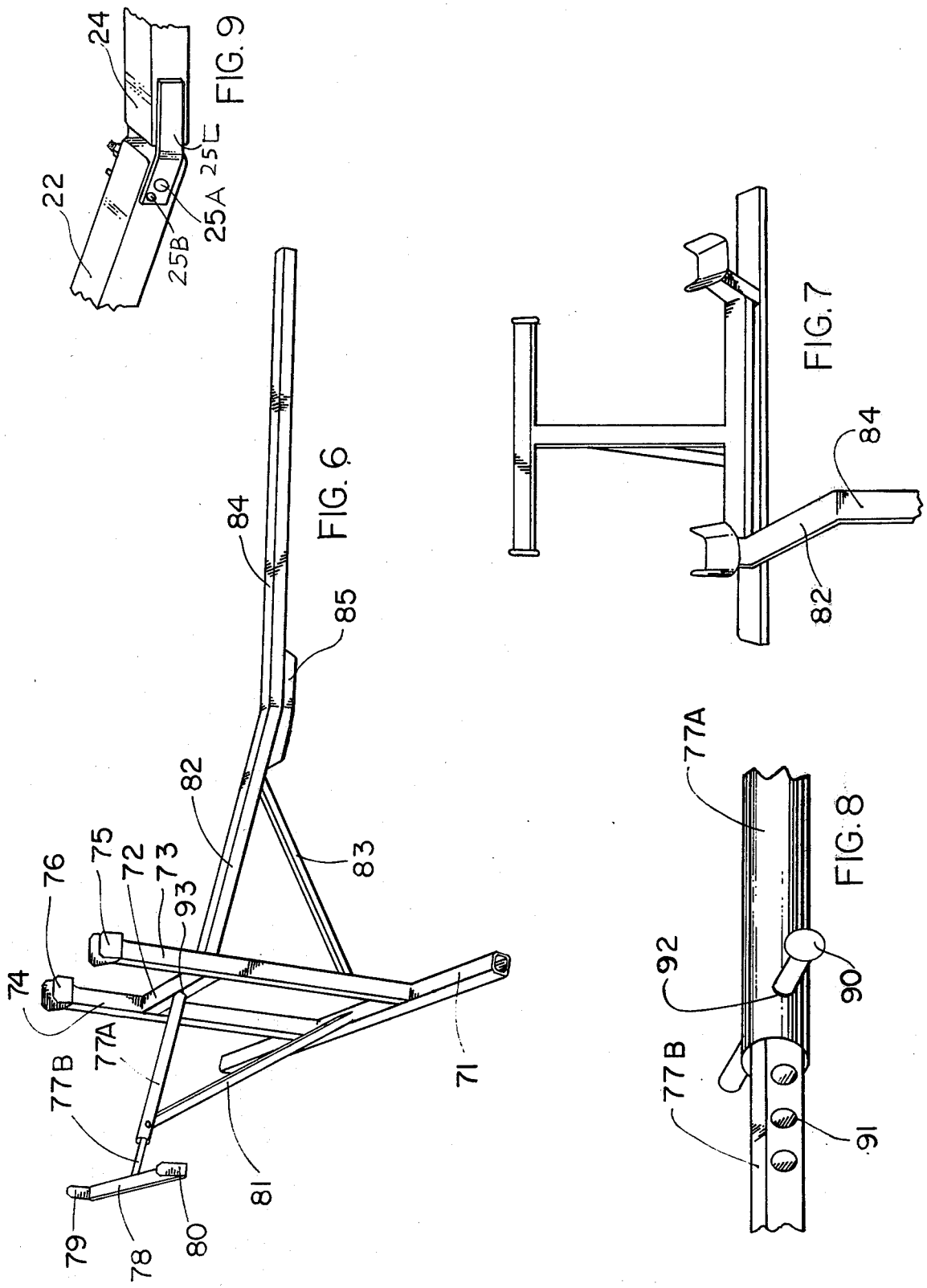

SUPPORT FOR A MOTORCYCLE

BACKGROUND OF THE INVENTION

1. Field of the Invention

The invention relates to supports or stands; and, more particularly, to a device for supporting a motorcycle above a surface for carrying out repairs and maintenance thereon.

2. Description of the Prior Art

In recent years, with increased emphasis on the high cost of gasoline and the search for better gas mileage, many people have turned to motor-driven vehicles, such as motorcycles, minibikes, trail bikes and the like. Whatever class of "bike" a person may own, and they all may be collectively referred to as motorcycles, proper care through preventative maintenance, such as minor tune-ups, minor body work, regular oiling and greasing, etc., will go far in keeping the motorcycle in top running condition. The aforementioned care can be carried out by most owners and thus these owners can save the cost of such maintenance. Further, it is sometimes necessary to make minor repairs, such as replacing tires, tubes, chains, etc, which jobs can be carried out by most owners as well.

However, in all of the foregoing, it is necessary to have the motorcycle supported in a steady upright manner. Although most such motorcyles have kick-stands of some type, these stands are usually not rigid enough to provide a firm support for the motorcycle to carry out the aforementioned repairs and preventative maintenance. Further, such stands do not usually raise the front wheel off of the ground and some do not even raise the rear wheel.

Although various cycle supports have been suggested in the past, such as those illustrated in U.S. Pat. Nos. 1,241,486; 1,628,854; 582,764; 590,769; 598,298; and 622,642, these supports are not strong enough for today's motorcycles. There is thus a need for an economical and easy to use support for motorcycles or the like.

SUMMARY OF THE INVENTION

It is an object of this invention to provide a support or a stand for a motorcycle which elevates both wheels off of the supporting surface and provides a steady firm support for the motorcycle.

It is still another object of this invention to provide such a stand or support which is simple and economical to manufacture and use.

These and other objects are preferably accomplished by providing a rigid framework structure having a rearwardly extending elongated rod for receiving the rear portion of the frame thereon and upwardly extending brackets for engaging and supporting the front portion of the framework of the motorcycle.

For a fuller understanding of the nature and objects of the invention, reference should be had to the following detailed description.

BRIEF DESCRIPTION OF THE DRAWING

FIG. 1 is a perspective view of a first embodiment of a motorcycle support in accordance with the teachings of our invention;

FIG. 2 is a perspective view of a second embodiment of a motorcycle support in accordance with the teachings of our invention.

FIG. 6 is a perspective view of another embodiment, similar to that of FIG. 1.

FIG. 7 is a top plan view of a variation of the embodiment of FIG. 6.

FIG. 8 is a close-up perspective view of a portion of the embodiment of FIG. 6.

FIG. 9 is a close-up perspective view of a portion of the embodiment of FIG. 1.

DESCRIPTION OF THE PREFERRED EMBODIMENTS

Figure 5:
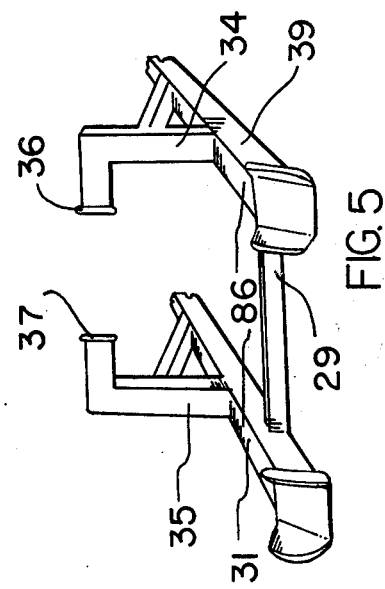
FIG. 5 is a top plan view of a portion of embodiment of FIG. 2.

Referring now to FIG. 1 of the drawing, a motorcycle stand or support 10 is shown having a first elongated main support bar 11 adapted to rest on surface 09, a second elongated support bar 12 spaced from bar 11 and generally parallel to and shorter in length thereof and a pair of elongated side bars 13 and 14 extending generally normal to bars 11 and 12 and forming generally a rectangular framework with bars 11,12. Bars 13,14, as seen in FIG. 1, extend from bar 11 past bar 12 and each bar 13,14 terminates in a U-shaped bracket 15,16, respectively.

First support bar 17 extends generally normal to and rearwardly from generally the midpoint of bar 12 and terminates in third support bar 18, usually about the same length as Bar 17 or bar 12. Bar 18 is generally parallel to bar 12, and bar 17 intersects bar 18 at generally the midpoint thereof. Each end of bar 18 terminates in an upwardly extending ear of flange 19,20. Flanges 19,20 extend in the same direction as U-shaped members 15,16, preferably.

A cross-brace 21 extends between bar 11 and bar 17 to provide rigidity to the structure or support 10. An elongated support bar 22 extends from side bar 13 in generally the same plane as bar 17 but oppositely directed thereto. A cross-brace 23 extends between bar 22 and bar 13 to provide added rigidity. An elongated base support bar 24 is pivotally connected to bar 22 at pivot point 25. As can be seen in FIG. 1, bar 24 is appreciably longer than bar 22, and can be folded back thereon for storage. Any suitable means, such as aligned apertures and lock pins (see FIG. 9) may be provided for locking bar 24 in the FIG. 1 position.

Obviously, the support or stand 10 can be modified in accordance with the teachings of the invention. For example, in FIG. 2, a modified support 30 is shown resting on surface 09. Bar 28 is similar to bar 11, bar 29 is similar to bar 12 and side bars 31,39 are similar to side bars 13,14. Bars 31, 39 also terminate in upwardly directed U-shaped brackets 33,32 similar to brackets 15,16. Instead of support bar 17 as in the FIG. 1 embodiment, a pair of elongated bars 34,35 are opposed extending normal to and from each side bar 39,31. Each L 34,35 terminates in an upwardly directed flange member 36,37, respectively, and is braced by a cross bar 47,48, respectively, extending to the respective side bars 39,31.

Bar 40 is similar to bar 22 of FIG. 1, cross bar 41 is similar to cross bar 23 of FIG. 1 and elongated base support bar 42 is similar to bar 24 in FIG. 1. Bar 42 may also be pivotally connected to bar 40, as previously discussed, if desired.

It is to be understood that while cross brace 21 is shown in FIG. 1 to be secured to the distal end of first support bar 17, it can just as well be secured on the underside at the midpoint of elongated third support bar 18. In this figure, gusset 43 acts to reinforce the junction of bars 40 and 42 shown rigidly connected.

Figure 3:
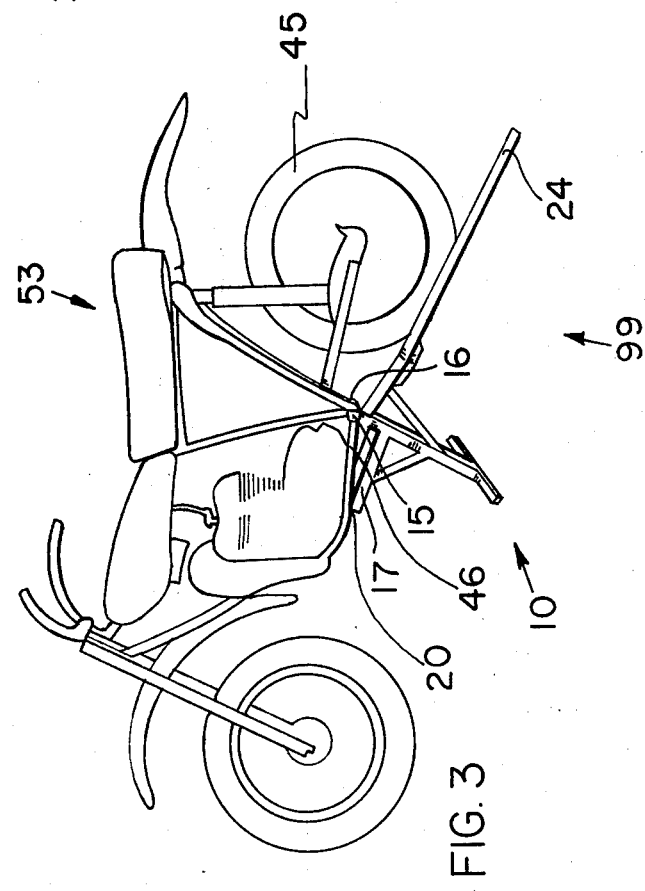
FIG. 3 is a vertical view of a motorcycle supported on the motorcylce support of FIG. 1.

FIG. 3 shows the support of 10 of FIG. 1 supporting a motorcycle 53. As can be seen, the end of bar 24 rests on surface 99 with the rear wheel 45 of motorcycle 53 supported in a raised position relative to surface 99. The U-shaped brackets 15,16 engage the rear portion of the frame assembly 46 of motorcycle 53 while bar 18 supports the front portion of the motorcycle frame 46 holding front wheel of motorcycle 53 in raised position relative to surface 99 with flanges 19,20 preventing lateral movement of frame 46.

The stand or support 30 supports motorcycle 53 in like manner, the only difference being that brackets 36,37 are disposed in a different location as to the cycle frame. Further description is thus deemed unnecessary.

It can be seen that we have disclosed a simple inexpensive stand or support that raises the wheels of a vehicle such as a motorcycle off of the support surface permitting repairs and maintenance thereon. The stand or support holds the motorcycle in a steady manner without lateral movement thereof since it positively grasps the motorcycle structure.

Figure 4:
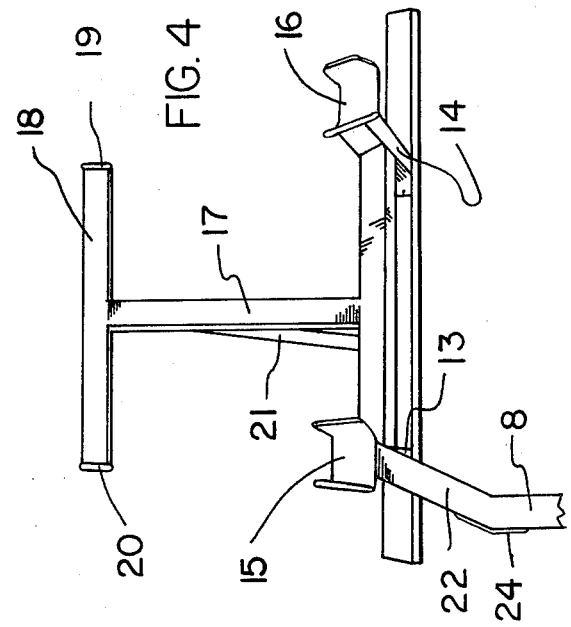
FIG. 4 is a top plan view of a portion of the embodiment of FIG. 1.

FIG. 4 is a top plan view of an alternate form of the embodiment of FIG. 1. This view shows the generally T-shaped structure formed by the junction of support bar 17 with third support bar 18. Also shown in said Figure are the spaced apart upstanding flanges 19 and 20 as well as cross brace 21, side bars 13 and 14 and their respective U-brackets. The difference between the embodiment of FIG. 4 and FIG. 1 is that bar 24 is fixedly secured to bar 22 rather than being pivotally secured thereto. A gusset 08 is secured on the underside of each to strengthen the joint.

FIG. 5 is a top plan view of a portion of the embodimnet of FIG. 2. L-shaped bars 35 and 34 are shown to be in the same horizontal plane and to extend inwardly toward each other. Each terminates in an upstanding flange 37 and 36 respectively which are disposed parallel to each other.

FIG. 6 shows an alternate version of the embodiment of FIG. 1. Here bar 71 is the same as bar 11. Likewise bars 72,73,74,77 and 78 are the same as bars 12,13,14,17 and 18 respectively. U-brackets 75 and 76 and flanges 79 and 80 are the same as their counterparts 15,16,19 and 20 in FIG. 1. Bar 81 is similar to cross brace 21 and extends from main support bar 71 to a point on tube 77A.

Elongated support 82 extends outwardly from side bar 73 in generally the same plane as bar 77 but is directed oppositely thereof. A cross brace 83 extends between side bar 73 and bar 82 to provide rigidity. Elongated base support 84 is disposed inwardly from the extremity of 82 in the same plane such as to be generally perpendicular to bar 72. Angular gusset 85 is secured to bars 82 and 84 on the underside thereof to provide rigidity.

The other difference between the embodiments of FIG. 1 and FIG. 6 is the fact that support bar 77 comprises two telescoping members, 77A the exterior and 77B the interior. Reference is made to FIG. 8. Here member 77A must of course be tubular, while 77B may be tubular or of rod stock. A loose cut telescoping technique would employ a steel tube for 77A with a pair of opposed apertures 92 one per side of the tube, with a plurality of spaced longitudinally opposed apertures or bores 91 depending on the material employed for 77B to align with apertures 92. Rigidity would be maintained by pin 90. This telescoping means of FIG. 8 may be readily adapted to the side bars 12 and 13 at the top thereof and denoted as 86 in FIG. 1.

Obviously other telescoping techniques can be employed as well. Further, the telescoping concept can be applied to the embodiment with FIG. 1 without the folding handle, and to the L-shaped bars 34 and 35 of the embodiment of FIG. 2.

Optionally it may be desirable for certain motorcycles to have cross brace 81 telescopes as well as or instead of support bar 77 in order to change the inclination of 77. If such is deemed desirable, then 77 will have to be pivotally mounted on 72 rather than being fixedly secured thereto. Any pivot means known to the art that allows proper rotation of 77 around potential pivot point 93 when such is employed may be used. Thus 81 will of necessity be pivotally secured at its junction with main support bar 71 and bar 77a to accomplish this.

Turning to FIG. 7 a fragmented view of any of the previous embodiments, handle 84 is mounted inboard. The rear wheel of the cycle still does not rest on bar 84, which is outboard to said wheel. In this location handle 82,84 may not be used as a lever, but only as the third ground contact for stability.

Any suitable materials may be used, such as steel tubing. The tubing may be any suitable configuration, such as square in cross-section. The various sections may be welded, brazed or bolted together in any suitable manner. Although we have used the term "motorcycle", our stand or support can be used with any motor-driven cycle in accordance with the teachings of the invention. That is, the dimensions of our stand or support may be altered to accommodate a motorcycle of any size and dimension as long as the basic components remain.

We have found that excellent results can be achieved using a combination $\frac{1}{2}''$, $\frac{3}{4}''$, and $1''$ square tubing. We have employed the $1''$ tubing for the "handle means", comprising the combinations of the elongated support and elongated base support bar, eg. 22, 24; 40,42 and 82,84; and for the side bars. We employ $\frac{1}{2}''$ tubing for the cross braces and $\frac{3}{4}''$ for the remaining bars. Though not shown, the main support bars 11,28 and 71 may be plugged to prevent the accummulation of dirt and water therein, as would be known to the art. While tubing is disclosed, rod stock can be used.

The device of this invention may be utilized as assembled or finished with conventional metal paints such as flat black, and safety orange by processes known to the metal finishing art, or metal plating, also known to the art.

The disadvantage of the embodiment in FIG. 7 wherein the handle is mounted inboard is the fact that the repair person must physically lift the cycle onto the stand to carry out the repairs. This is true even though the handle does not have the wheel resting thereupon. Handle 82,84 may be used only for stability and not be used as a lever.

It is seen therefore that by having the handle, be it 84,42 or 24, positioned approximately parallel to the length of the cycle that the repair person can use the handle as a lever to lift the cycle onto the stand by pivotally orienting the main support bar, be it 11, 28 or 71.

It is seen that the motorcycle 53 when placed on any of the embodiments of the support of the invention is prevented from lateral movement in the forward area, near front wheel, by any of 26,27; 79,80; and 19,20. In the rearward area lateral movement is prevented by the U-shaped brackets on the side bars.

Previously we have indicated that bar 24 may be made to fold back in the direction of bar 12 in order to minimize storage space during periods of non-use of the device of this invention.

Referring now to FIG. 9, it is seen that elongated support bar 24 has a pair of plates 25C mounted on per side, rigidly secured thereto. These plates are secured pivotally to bar 22 at pivot point 25 by carriage bolt 25A and a suitable nut. To insure stability and non-rotation during periods of use, pin 25B is inserted through suitably aligned apertures in bar 22 to prevent rotation around pivot point 25. If desired, a cotter pin or other securing means may be used in conjunction with locking pin 25B.

It is also within the scope of this invention to have the side rods of all embodiments adjustable upwardly and downwardly. This can be accomplished by having the upper portions of same, designated 86 in the various drawings, telescope. Naturally tubular rather than solid rod stock would have to be employed for the outer side rods if such telescoping capability is desired.

It is also within the scope of this invention to have bar 21 of the embodiment of FIG. 1 pivotally secured to both bar 17 and main support bar 11, and bar 17 pivotally secured to bar 12 allow the inclination of bar 17 to be adjustable. All these pivotal mountings are necessary to permit the adjustment of bar 17 angularly.

It is also within the scope of this invention for all of the embodiments shown in the Figures to have the stands adjustable laterally in order to accommodate motorcycles where frames vary in width. This may be accomplished by the use of the telescoping means, such as those described above and in particular, the mode depicted in FIG. 8 herein. Of course for esthetic purposes, one would probably choose to have both the inner and outer tubes to be square rather than one round and one square as in the Figure. Thus any of the cross braces 12,29 and 72 would be extendable and contactable as would main support members 11, 28 and 71. Obviously both of the two parallel bars would have to be either rigid or telescopeable.

It would also be within the scope of the invention to employ telescoping third support bars 18 and 78 when one employs extendable versions of the bars mentioned just above.

Since certain changes may be made in the above apparatus without departing from the scope of the invention herein involved, it is intended that all matter contained in the above description and shown in the accompanying drawings shall be interpreted as illustrative and not in a limiting sense.

We claim as our invention:

1. A motorcycle support device adapted to embrace the frame structure of a motorcycle when supported on a supporting surface comprising;

an elongated main support rod adapted to rest on a supporting surface;

a second support rod spaced from said main support rod extending generally parallel thereto;

a pair of side bars interconnecting said main support rod and said second support rod forming a generally rectangular framework;

said side bars extending upwardly past said second support rod, and, each terminating in an upwardly extending U-shaped bracket;

at least one first support bar extending in a direction generally normal to the plane of said framework, said at least one first support bar having means thereon for embracing the frame of a motorcycle; and an elongated handle member extending in a direction opposite that of said at least one support bar and outwardly from one of said side bars to a point spaced from and rearwardly of said main support rod.

2. In the device of claim 1 wherein said means for embracing includes a long support member extending generally normal to said at least one first support bar connected at generally the midpoint of member extending generally parallel to said second support rod, each end of said long support member terminating in an upwardly extending flange extending in the same direction as said U-shaped brackets.

3. In the device of claim 2 including a cross-bar extending between the distal end of said first support bar and the said main support rod.

4. In the device of claim 1 wherein said elongated handle member includes a first bar portion, a cross-brace extending between said first bar portion and said one of said side bars, and a second bar portion pivotally coupled to said first bar portion and movable from a first position foldable back on said last-mentioned bar portion to a second position extending outwardly therefrom.

5. In the device of claim 1 wherein said at least one support bar comprises a pair of opposed L-shaped support bars, one of said L-shaped support bars extending generally normal to and connected to one of said side bars and the other of said last-mentioned L-shaped bars extending generally normal to and connected to the other of said side bars, each of said L-shaped bars terminating in an upstanding flange extending in the same direction as said U-shaped brackets.

6. In the device of claim 5 including a cross-brace extending between each of said opposed L-shaped bars and its respective side bars.

7. In the device of claim 1 wherein the upper portions of said side bars are telescopingly extendable.

8. In the device of claim 5 wherein the side bars are telescopingly extendable.

9. In the device of claim 1 wherein the support bar is telescopingly extendable.

10. In the device of claim 5 wherein said L-shaped bars are telescopingly extendable.

11. In the device of claim 4 wherein the first support bar is telescopingly extendable.

12. In the device of claim 3 wherein the cross bar is telescopingly extendable and said first support bar is pivotally secured to said framework.

13. In the device of claim 1 wherein the main support bar and the second support bar are laterally telescoping.

14. The device of claim 1 wherein the first support bars and the cross braces are pivotally connected at their junctions to permit the inclination of said first support bar to be varied.

15. The device of claim 10 wherein said side bars are telescopingly extendable.

16. In the device of claim 6 wherein the main support bar and the second support bar are laterally telescoping.

17. In the device of claim 12 wherein the main support bar and the second support bar are laterally telescopic.

18. A device for supporting a motorcycle in an elevated position with respect to a supporting surface wherein said motorcycle has lt lease a front wheel, a rear wheel, a frame structure and an exhaust system on said frame structure coupled to said engine, said support comprising;

frame structure engaging means resting on said supporting surface, raising said frame structure to a distance above said supporting surface sufficient to raise both of said wheels off of said supporting surface, wherein said frame structure engaging means includes a main support bar resting on said support surface and a pair of upwardly extending side bars coupled to said main support bars terminating at their upper ends in brackets engaging supports said frame structure, said frame structure engaging means including lateral movement preventing means thereon for preventing lateral movement of said motorcycle, and pivoting means to raise said motorcycle off of said supporting surface wherein said lateral movement preventing means on said frame structure engaging means includes said brackets being U-shaped and said lateral movement preventing means in the forward cycle area are upstanding flanges.

* * * * *